(12) United States Patent
Vitiello

(10) Patent No.: US 12,472,036 B2
(45) Date of Patent: Nov. 18, 2025

(54) APPARATUS FOR MOLDING DENTAL ALIGNERS

(71) Applicant: Ciro Vitiello, Florence (IT)

(72) Inventor: Ciro Vitiello, Florence (IT)

( * ) Notice: Subject to any disclaimer, the term of this patent is extended or adjusted under 35 U.S.C. 154(b) by 312 days.

(21) Appl. No.: 18/034,470

(22) PCT Filed: Oct. 29, 2021

(86) PCT No.: PCT/IB2021/060041
§ 371 (c)(1),
(2) Date: Apr. 28, 2023

(87) PCT Pub. No.: WO2022/091027
PCT Pub. Date: May 5, 2022

(65) Prior Publication Data
US 2025/0073001 A1 Mar. 6, 2025

(30) Foreign Application Priority Data

Oct. 30, 2020 (IT) .................. 102020000025858

(51) Int. Cl.
*B29C 51/10* (2006.01)
*A61C 7/08* (2006.01)
(Continued)

(52) U.S. Cl.
CPC ................ *A61C 7/08* (2013.01); *B29C 51/10* (2013.01); *B29C 51/22* (2013.01); *B29C 51/262* (2013.01);
(Continued)

(58) Field of Classification Search
CPC ....... B29C 51/10; B29C 51/46; B29C 51/262; B29C 51/22; B29C 51/421; B29C 2791/007; B29C 2791/006; A61C 7/08
See application file for complete search history.

(56) References Cited

U.S. PATENT DOCUMENTS

| 2005/0082703 | A1 | 4/2005 | Wrosz |
| 2017/0144360 | A1 | 5/2017 | Moore, III et al. |
| 2020/0290262 | A1 | 9/2020 | Aguilar et al. |

FOREIGN PATENT DOCUMENTS

| DE | 10307688 | 9/2004 |
| EP | 1905380 | 4/2008 |

OTHER PUBLICATIONS

International Search Report Dated Feb. 23, 2022.
(Continued)

*Primary Examiner* — Monica A Huson
(74) *Attorney, Agent, or Firm* — Preston Smirman; SMIRMAN IP LAW, PLLC

(57) ABSTRACT

An apparatus (1) for thermoforming dental aligners provides a support structure (10) on which a rotary table (11) is mounted on which a plurality of operating modules (20) are mounted at an equidistant angle, each comprising a moulding support (21) suitable to house a dental arch (I) and a mounting support (22) suitable to house a disc of thermoformable material (F). The rotation of the table (11) brings the operating modules (20) in succession, at a heating device (30) in which the disc (F) is heated and softened and then at a moulding device (40) in which the mounting support is lowered into a lowered position (PA) to realize a moulding chamber (41) in which by means of an overpressure the disc (F) goes to copy the shape of the dental arch (I) to realize an aligner. An operator can load all the operating modules (20) and start the apparatus (1) in an automatic cycle, which sequentially produces all the aligners without the apparatus needing to be manned by the operator.

6 Claims, 4 Drawing Sheets

(51) Int. Cl.
    *B29C 51/22*          (2006.01)
    *B29C 51/26*          (2006.01)
    *B29C 51/42*          (2006.01)
    *B29C 51/46*          (2006.01)

(52) U.S. Cl.
    CPC ............ *B29C 51/421* (2013.01); *B29C 51/46* (2013.01); *B29C 2791/006* (2013.01)

(56) References Cited

OTHER PUBLICATIONS

Written Opinion of International Searching Authority Dated Feb. 23, 2022.
Written International Preliminary Report on Patentability May 2, 2023.
English Abstract of EP 1905380.
English Abstract of DE 10307688.

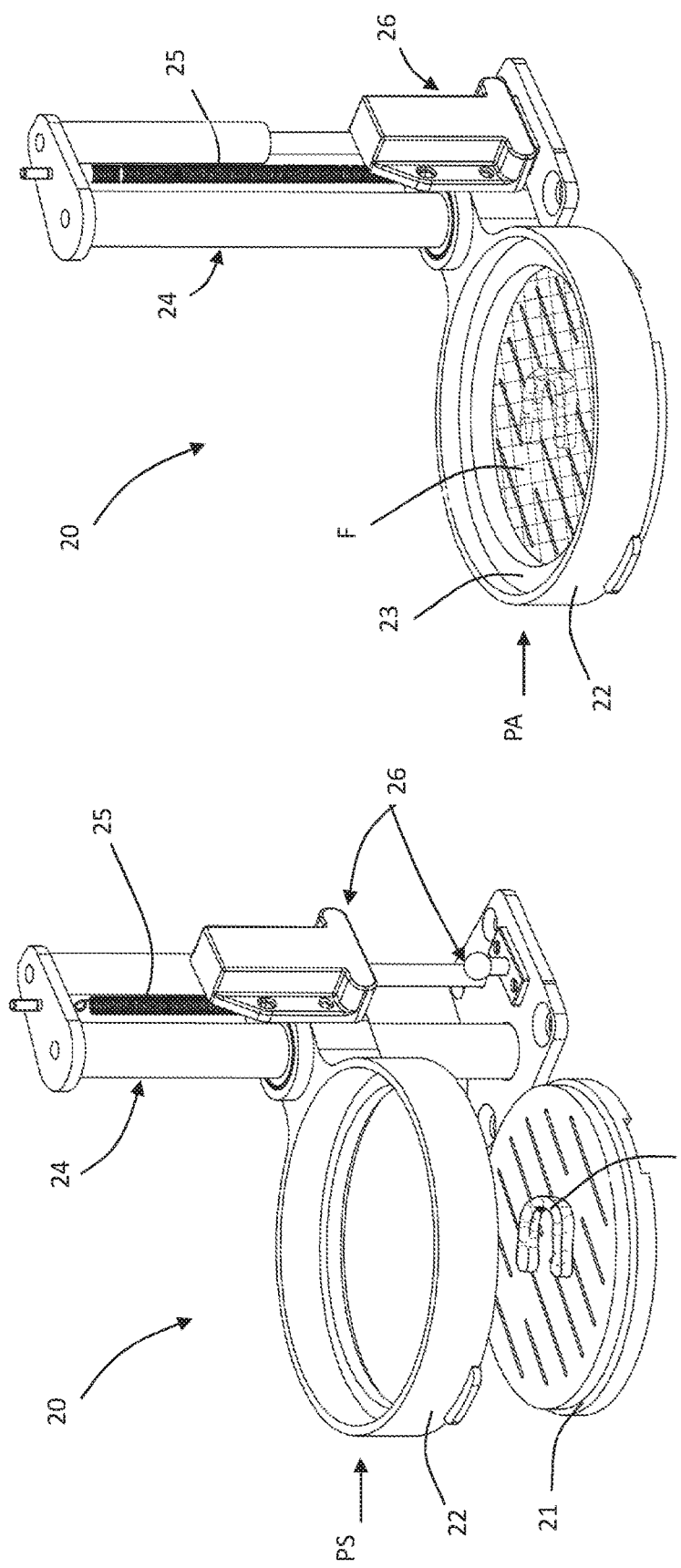

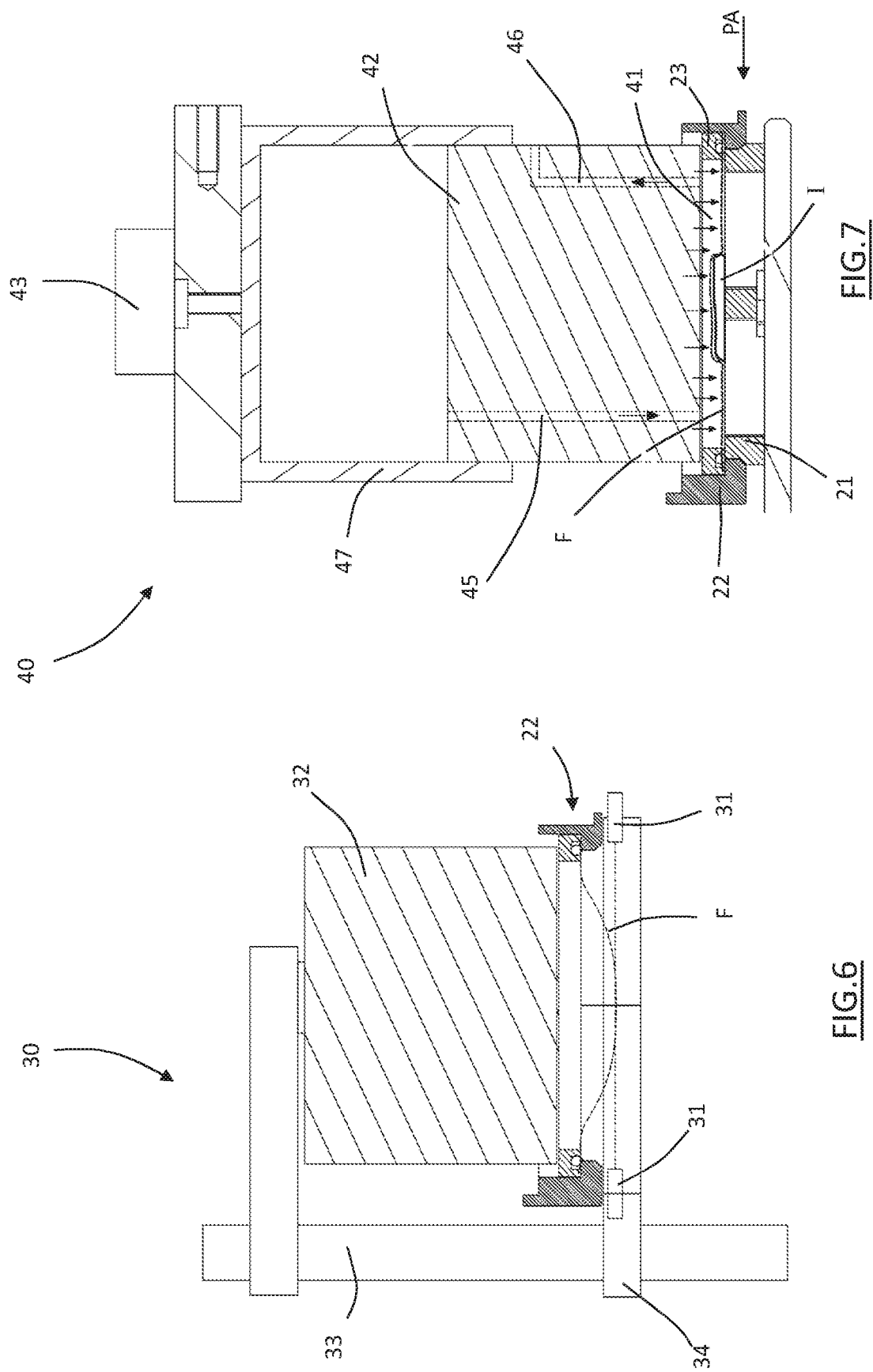

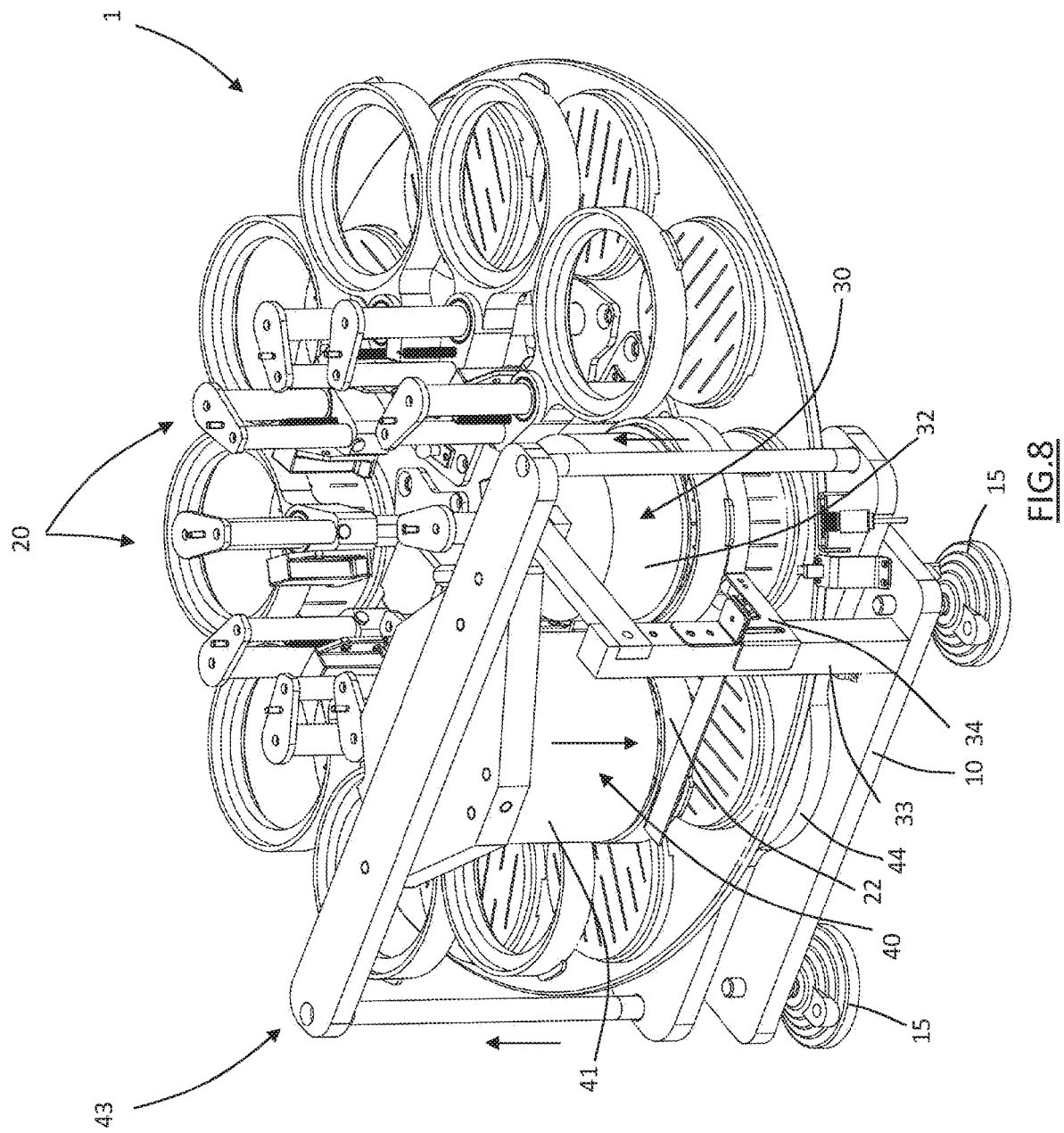

APPARATUS FOR MOLDING DENTAL ALIGNERS

CROSS-REFERENCE TO RELATED APPLICATION

The instant application is a national phase of PCT International Application No. PCT/IB2021/060041 filed Oct. 29, 2021, and claims priority to Italian Patent Application Ser. No. 10/202,0000025858 filed Oct. 30, 2020, the entire specifications of both of which are expressly incorporated herein by reference.

TECHNICAL FIELD

The present invention relates to an apparatus for the production of movable dental apparatuses.

More specifically, the invention relates to an apparatus for thermoforming movable dental apparatuses in which at least one moulding support is present suitable to house a dental arch, a mounting support suitable to house a thermoformable sheet, a heating position in which a heating device for heating the thermoformable sheet is present housed in the relative mounting support and a moulding position in which there is a moulding device suitable to realize together with the moulding support and mounting support a moulding chamber in which the impression and the thermoformable sheet previously heated in the heating position are located and in which a vacuum/overpressure is created to execute the thermoforming of said thermoformable sheet (F).

BACKGROUND ART

Movable dental apparatuses, in particular mouth guards and aligners, are functional apparatuses to be applied to the dental arch to correct specific positioning defects. In particular, the aligners are manufactured with CAM-CAD (Computer-aided manufacturing/Computer-aided design) technology: starting from the plaster impression of the patient's dental arch and then proceeding with a 3D scan of the same in order to digitize the geometry and obtain virtual 3D models. Subsequently, through the use of CAD software, the corrective stages of the malocclusion and the physical models of the arches for each of the corrective stages are reproduced. Based on these physical models, a series of aligners necessary to satisfy the intended treatment is moulded. In fact, the treatment with invisible aligners is based on the sequential use of aligners, realized with transparent thermoplastic material and characterized by appropriate geometry. A certain number of aligners must therefore be made for each patient.

The aligners are made of a thermoformable material such as polypropylene (PP), polycarbonate (PC), polyethylene terephthalate glycol (PETG) or thermoplastic polyurethane (TPU), by means of a thermoforming apparatus.

An apparatus for thermoforming dental aligners conventionally comprises a moulding support on which the dental arch is rested, a mounting support in which the thermoformable disc is housed, a heating head in which the thermoformable disc is heated to soften and a moulding moulding head in which a moulding chamber is created in which the dental arch and the softened disc superimposed thereon are located and in which a vacuum or overpressure is created to cause the disc to copy the shape of the impression.

Still conventionally, these apparatuses comprise a single working head in which the heating station and the moulding station are present and a mounting support which contains the thermoformable disc is manually fed first to the heating station and then moved, again manually, to the moulding station, in which the dental arch to be copied is arranged, also in this case manually.

Also known are so-called automatic devices in which the soft disc is moved from the heating station to the moulding station automatically.

Apparatuses as outlined above are, for example, those covered by European patent EP 1 905 380 B1 and German patent DE10307688.

In the operation of this type of machine, the high operator time required is a very significant limitation since, as previously highlighted, each individual treatment requires the production of a multiplicity of aligners. In fact, the analysis of the required operator time showed that the operator must always remain close to the machine to reload the disc and dental arch when the cycle is finished. The type with automatic movement is more advantageous because it does not require the intermediate operation of the operator to move the heated disc from the heating zone to the moulding zone. The operator time for each aligner produced is estimated at approximately 180 seconds of machine operation in the manual type, to which are added approximately 20 seconds of loading and unloading the disc and dental arch. The operator time for the automatic type is comparable to the previous one if the machine must continuously produce a number of aligners. In fact, by producing one aligner at a time, despite being automated from heating to moulding, the operator must still load one set at a time at the end of a cycle.

Apparatuses capable of producing multiple aligners at the same time are also known, thus reducing the operator time required to make a number of aligners. This category includes apparatuses having a single moulding head of increased size in which more than one dental impression may be housed at the same time and a moulding disc of increased size. In this type of apparatus the operator times are obviously reduced and however the aligners produced with this type of apparatus are judged of poor quality because the presence of several dental impressions (up to 9) on which a single thermoformable material disc is thermoformed results in an incorrect stretching of the disc heated on the impression and therefore in an inadequate quality of the final product.

Finally, apparatuses are also known comprising a plurality of heating heads and as many moulding heads for simultaneously thermoforming a plurality of aligners. An apparatus of this type is described for example in US20170144360 which provides a vacuum plate to which are associated a plurality of supports suitable to house dental impressions arranged in succession. The thermoformable material in the form of a continuous strip is fed to extend over the plate over which there is a heating head with a plurality of heating elements movable over the plate between a waiting position and a heating position. When the thermoformable material is lying on the plate, a plurality of aligners can be made simultaneously. However, also in this apparatus there is a single thermoformable sheet, thus it has the same limits as the system with enlarged head previously described.

Another limit of all the apparatuses highlighted above is related to the heating step. In most of the apparatuses the heating step is timed. This often results in a not optimal heating of the moulding disc mainly due to possible small differences in the thickness thereof or to the use of thermoformable materials of different composition.

From EP 1 905 380 the possibility of measuring the temperature reached by the thermoformable disc by means of an infrared sensor is also known. However, this involves the heating term being defined based on the achievement of a certain temperature. The infrared sensor has on the one hand a high cost, and also performs a reading that is not always precise both because the thermoformable disc has high radial thermal gradients and because this measurement can be influenced by the presence of the heating element present above.

SUMMARY OF THE INVENTION

The object of the present invention is to propose an apparatus for the thermoforming of dental aligners capable of exceeding the limits of the prior art highlighted above, in particular with regard to the operator time necessary to realize an entire set of aligners.

Another object of the present invention is to propose an apparatus for the thermoforming of dental aligners that has a high productivity, both by virtue of the reduced operator times, and for a drastic reduction of the moulding time.

Another object of the present invention is to propose an apparatus for thermoforming aligners in which the heating head is optimized in particular to ensure that the thermoformable disc is optimally heated.

The above objects are achieved by an apparatus for the thermoforming of dental aligners as provided in claim 1.

Conventionally, an apparatus for the thermoforming of dental aligners, comprises a support structure suitable to house a plurality of moulding supports each suitable to house at least one dental arch, a mounting support suitable to house a thermoformable sheet and a relative retaining ring element, a heating device for heating a thermoformable sheet housed in said mounting support and a moulding device suitable to realize together with said moulding support and mounting support a moulding chamber, said moulding device being suitable to realize a vacuum/overpressure in said moulding chamber for executing the thermoforming of said thermoformable sheet, said mounting support being movable at least between a heating position in which it is associated with said heating device and a moulding position in which it is associated with said moulding device.

According to a characteristic aspect of the present invention, to each of said moulding supports of the apparatus are associated a relative mounting support and retaining ring element in an operating module, a plurality of operating modules being arranged at an angle equidistant on a rotary table of said support structure, said rotary table being operated in rotation in discrete steps to bring each of said operating modules in succession, first at said heating position and subsequently at said moulding position.

By virtue of the presence of a plurality of operating modules mounted on a rotary table, the apparatus of the invention allows to simultaneously load a plurality of sets for realizing as many dental impressions, thus allowing the operator to not man the apparatus for the entire processing period until all the aligners have been made.

Advantageously, the heating device comprises at least one contactless sensor arranged to detect a certain amount of deformation of said thermoformable sheet as a result of the softening to which it is subject due to the heating, a control unit of said apparatus being configured to determine the interruption of a heating step in said heating position as a function of the information received from said contactless sensor.

The contactless sensor detects the extent of deformation undergone by the thermoformable disc as a result of its softening and thus allows to directly determine when the degree of softening achieved is ideal for the subsequent moulding operation.

BRIEF DESCRIPTION OF THE DRAWINGS

These and other advantages associated with the apparatus for the thermoforming of dental aligners of the present invention will moreover be more easily understood by means of the illustration of a non-limiting embodiment, as described below with the aid of the attached drawings, in which:

FIG. 3 shows a perspective view of an operating group of the apparatus of FIG. 1 in a first working position;

FIG. 4 shows the group of FIG. 3 in a different working position;

FIG. 5 shows an exploded sectional view of some components of the group of FIG. 4;

FIG. 6 shows a schematic sectional view of a heating device of the apparatus of FIG. 1;

FIG. 7 shows a schematic sectional view of a moulding device of the apparatus of FIG. 1;

FIG. 8 shows a further perspective view of the apparatus of FIG. 1.

DESCRIPTION OF THE PREFERRED EMBODIMENTS

Figure 2:
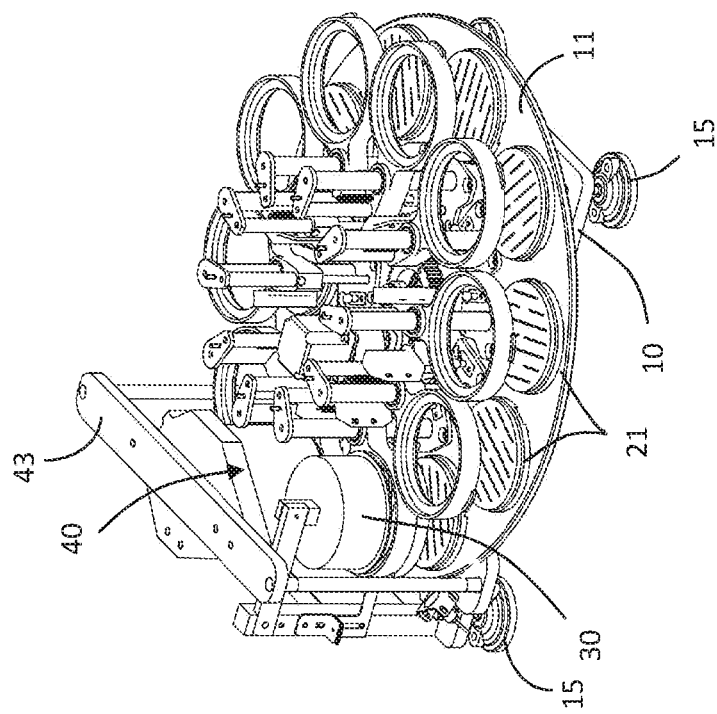
FIG. 2 shows a perspective of the apparatus of FIG. 1.
Figure 1:
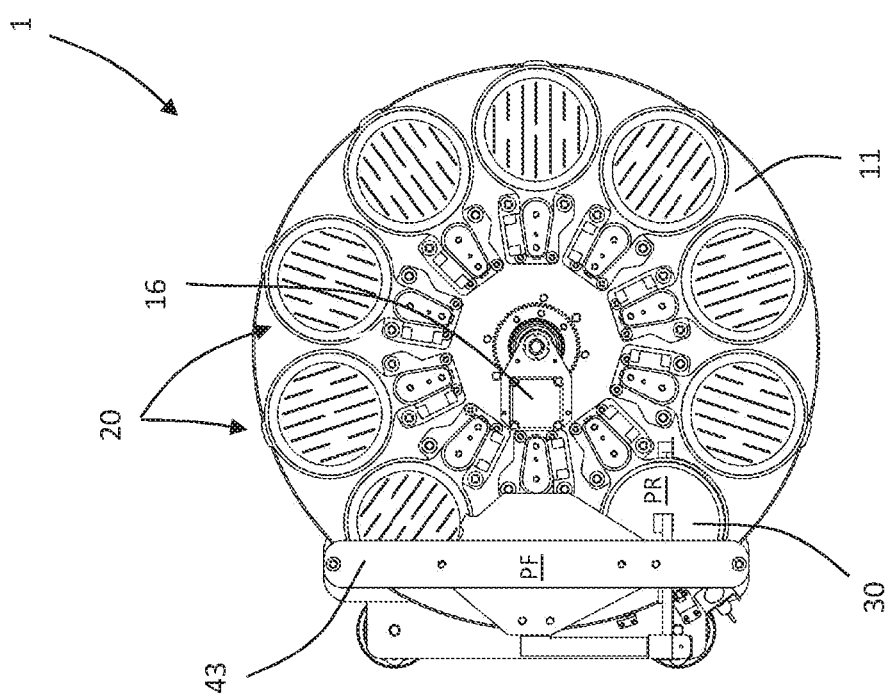
FIG. 1 shows a top view of an apparatus for moulding dental aligners according to the invention.

With reference to FIGS. 1, 2 and 8, an apparatus for thermoforming dental aligners according to the present invention is indicated as a whole with 1, which comprises a support structure, 10, provided with feet, 15, on which a rotary table, 11, centrally hinged to the support structure 10 and operated in rotation with respect to its vertical barycentral axis by means of a gear motor, 16, housed on the support structure 10 near the rotation axis of the table 11 and electronically controlled.

On the rotary table 11 are arranged at an angle equidistant from each other a plurality of operating modules, 20, which in this embodiment are ten in number.

With reference to FIGS. 3, 4 and 5, each operating module 20 comprises: a moulding support, 21, permanently anchored to the rotary table 11 and arranged to receive at least one dental arch, I; a vertical slide, 24 to which a mounting support, 22 is slidably associated; a return element, 25 consisting in this embodiment of a spring, suitable to push the mounting support 22 upwards; and a locking/unlocking mechanism, 26, which keeps the mounting support 22 locked in a lowered moulding position, PA, when the latter is pushed downwards and which selectively releases it to allow it to return to a raised position, PS. In alternative embodiments, the reference element may be of a magnetic type and the locking/unlocking mechanism 26 may not be present in this case.

With reference in particular to FIG. 5, the mounting support 22, movable above the moulding support 21, is suitable to house a thermoformable disc, F, and a retaining ring, 23, which keeps the disc F in position once inserted into the mounting support 22.

Referring to FIGS. 1, 2, 6 and 8, at a position which each operating group 20 can assume following the rotation of the rotary table 11, called the heating position, PR, a heating device 30 is mounted. The heating device 30 provides a heating head, 32, mounted above the raised position PS of the mounting support 22, by means of a column, 33, stably associated with the support structure 10. An arm, 34, arranged at an adjustable height along the column 33, carries a contactless sensor, 31, arranged below the mounting support 22 near the latter. The contactless sensor 31 is advantageously a horizontally arranged optical sensor for measuring the vertical deformation of the heated thermoformable disc F. In fact, as schematically shown in FIG. 6, following the heating, the disc F softens moulding, due to the force of gravity, a sort of bubble extending downwards with respect to the relative initial lying plane. When the bubble reaches the height at which the sensor 31 is positioned, it is detected by the sensor and consequently a control unit of the apparatus interrupts the heating step.

Referring to FIGS. 1, 2, 7 and 8, at a further position that each operating group 20 can assume following the rotation of the rotary table 11, called the moulding position, PF, a moulding device 40 is mounted.

The moulding device 40 comprises a cylinder, 47, with a piston, 42, which actuated downwards presses on the retaining ring 23 bringing the mounting support 22 in its lowered position in abutment on the moulding support 21. In this configuration, the moulding support 21, the mounting support 22 and the piston 42 define a sealed moulding chamber 41. According to known methods, at least one inlet pipe 45 is provided for bringing a fluid to the moulding chamber so as to put pressure on the latter so that during a moulding time the disc F is pushed to copy the shape of the dental arch I. In the advantageous embodiment illustrated in FIG. 7, the moulding device 40 comprises an outlet pipe, 46, communicating with the moulding chamber 41 to allow the expulsion of gas from said moulding chamber 41. The outlet pipe 46 is arranged to remain at least partially open during the application of the moulding pressure, so that during the application of said moulding pressure there is a gas circulation from the inlet pipe 45 to the moulding chamber (41) and then to the outlet pipe 46 to be expelled outside the moulding device. This makes it possible to significantly reduce the moulding time and therefore increase the productivity of the apparatus since the gas circulation in the moulding chamber 41 allows a high heat removal and therefore a much faster cooling of the thermoformable material. The outlet pipe 46 is obviously calibrated in size to allow the flow of gas without causing significant pressure losses in the moulding chamber 41. Alternatively, the pipe 46 may be opened with a certain delay with respect to the closure of the moulding chamber 41 and the realization of the overpressure therein.

The moulding device 40 is mounted on a self-supporting structure, 43, associated with the support structure 10 and which provides a striker element, 44, arranged below in contact with said rotary table 11 during the downward pressure operation of the piston 42 so that the pressure exerted by said piston 42 is supported by said striker element 44 instead of by the rotary table 11. In fact, as indicated by the arrows in FIG. 8, when the piston 41 is lowered to bring the mounting support 22 into the lowered position PA, the self-supporting structure 43 is raised by bringing the striker element 44 in abutment under the rotary table 11. Thereby, the relevant applied forces of the piston 41 and the pressure present in the moulding chamber 41 (about 600-700 Kg), are not supported by the rotary table 11, which could suffer damage to the relative bearings through which it is mounted on the support structure 10, but by the striker element 44.

From the foregoing description, the operating mode of an apparatus according to the present invention is readily understandable. The automatic movement for discrete angular steps of the rotary table 11 brings the operating modules 20 in succession first at the heating position PR and then at the moulding position PF. The moulding of the disc F present in an operating module 20 and the heating of the disc F present in the angularly subsequent operating module 20 therefore take place simultaneously without dead times. The movement of the rotary table 11, the activation and deactivation of the heating device 30 and the activation and deactivation of the moulding device 40 are automated and controlled by a programmable control unit.

To ensure maximum operator safety, the apparatus 1 is obviously provided with an appropriate casing, not shown in the figures, which completely prevents access during operation. The casing can be removed or provides an access door to allow loading all the operating modules 20 with the necessary dental impressions I and thermoformable discs F, after which the access is closed and the apparatus 1 is started to operate autonomously until all the loaded operating modules 20 have been processed. This allows an operator to engage in other activities while the apparatus produces a number of aligners even equal to the number of operating modules 20 with which the apparatus is provided. Alternatively, a permanent access position can be provided, on a side opposite to that where the heating device 30 and the moulding device 40 are located, to allow the transiting operating module to be unloaded and loaded at the aforementioned access position, so that the apparatus, manned by an operator, can work in a continuous cycle without interruptions.

The embodiment depicted of an apparatus for the thermoforming of dental aligners depicted in the attached drawings and described above must be understood as exclusively exemplary of the invention, and not limiting, and further variations and modifications in addition to those already mentioned may be provided without departing from the inventive concept of the present invention.

In fact, many variants can be envisaged by the person skilled in the art, replacing the individual components with other functionally equivalent ones, remaining within the scope of the inventive idea described above and within the scope of protection defined by the following claims.

The invention claimed is:

1. An apparatus for thermoforming dental aligners, comprising:
   a support structure that houses at least one molding support, each one suitable to house at least one dental arch;
   a mounting support with a relative retaining ring element suitable to house and retain a thermoformable sheet;
   a heating device for heating a thermoformable sheet housed in the mounting support; and
   a molding device suitable to realize together with the at least one molding support and mounting support a molding chamber, the molding device being suitable to create a vacuum or overpressure in the molding chamber to execute the thermoforming of the thermoformable sheet, the mounting support being mobile at least between a heating position in that it is associated with the heating device and a molding position in which it is associated with the molding device;
   wherein the at least one molding support is associated with a relative mounting support and annular retaining element in an operating module, a plurality of operating modules being placed at an angle equidistant on a rotary table of the support structure, the rotary table being operated in rotation in discrete steps to bring each of the operating modules in succession, first at the heating position and then at the molding position.

2. The apparatus for thermoforming dental aligners according to claim 1, wherein the heating device comprises:
   at least one contactless sensor arranged to detect a certain amount of deformation of the thermoformable sheet as a result of the softening to which it is subject due to heating; and
   a control unit of the apparatus being configured to determine the interruption of a heating step in the heating position according to the information received from the contactless sensor.

3. The apparatus for thermoforming dental aligners according to claim 1, wherein, in the operating module, the at least one molding support is placed on the rotary table and the mounting support is movable above the corresponding at least one molding support at least between a raised loading position and a lowered molding position in which the mounting support is abutted on the at least one molding support, in which the molding device comprises a piston suitable to find abut mounting support and retaining ring element to push them towards the lowered molding position in order to realize the molding chamber and applying a suitable molding pressure to seal the molding chamber, and in which the piston is mounted on a self-supporting structure which provides for a striker element placed below in contact with the rotary table during the downward pressure operation of the piston so that the pressure exerted by the piston is supported by the striker element instead of the rotary table.

4. The apparatus for thermoforming dental aligners according to claim 1, wherein the operating module comprises:
   a vertical slide to which the mounting support is associated in order to slide and return elements suitable for pushing the mounting support upwards, wherein the return elements are made of elastic elements.

5. The apparatus for thermoforming dental aligners according to claim 1, wherein the operating module comprises:
   a locking or unlocking mechanism selectively suitable to keep locked in the lowered molding position or to allow the movement along the vertical slide of the mounting support.

6. The apparatus for thermoforming dental aligners according to claim 1, wherein the molding device comprises:
   pressure means suitable to pressurize the molding chamber through gas injection, the pressure means comprising at least one inlet pipe to allow the injection of gas to the molding chamber and at least one outlet pipe to allow the expulsion of gas from the molding chamber, the outlet pipe being arranged to remain at least partially open during the application of a molding pressure, so that during the application of the molding pressure there is a gas circulation from the inlet pipe to the molding chamber and therefore to the outlet pipe.

* * * * *